United States Patent
Kang et al.

(10) Patent No.: US 11,605,830 B2
(45) Date of Patent: Mar. 14, 2023

(54) APPARATUS FOR MANUFACTURING BATTERY CELL TO ENHANCE ELECTRODE WETTING THROUGH VIBRATION, AND MANUFACTURING METHOD OF BATTERY CELL USING THE SAME

(71) Applicant: LG CHEM, LTD., Seoul (KR)

(72) Inventors: Gyungsoo Kang, Daejeon (KR); Yong Tae Lee, Daejeon (KR); Jeeho Kim, Daejeon (KR); Myung Hoon Ko, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/253,297

(22) PCT Filed: Mar. 12, 2020

(86) PCT No.: PCT/KR2020/003473
§ 371 (c)(1),
(2) Date: Dec. 17, 2020

(87) PCT Pub. No.: WO2020/189962
PCT Pub. Date: Sep. 24, 2020

(65) Prior Publication Data
US 2021/0273255 A1    Sep. 2, 2021

(30) Foreign Application Priority Data

Mar. 18, 2019  (KR) .................. 10-2019-0030800

(51) Int. Cl.
*H01M 10/04*  (2006.01)
*H01M 10/63*  (2014.01)
*H01M 50/673*  (2021.01)

(52) U.S. Cl.
CPC ....... *H01M 10/0404* (2013.01); *H01M 10/63* (2015.04); *H01M 50/673* (2021.01)

(58) Field of Classification Search
CPC ... H01M 10/0404; H01M 10/63; H01M 50/60
See application file for complete search history.

(56) References Cited

U.S. PATENT DOCUMENTS

| 7,238,085 B2 | 7/2007 | Montierth et al. |
| 2005/0003737 A1 | 1/2005 | Montierth et al. |
| (Continued) | | |

FOREIGN PATENT DOCUMENTS

| CN | 102612767 A | 7/2012 |
| CN | 105742742 A | 7/2016 |
| (Continued) | | |

OTHER PUBLICATIONS

International Search Report issued in PCT/KR2020/003473 (PCT/ISA/210), dated Jul. 2, 2020.

(Continued)

*Primary Examiner* — Jimmy Vo
(74) *Attorney, Agent, or Firm* — Birch, Stewart, Kolasch & Birch, LLP

(57) ABSTRACT

An apparatus for manufacturing a battery cell to enhance the electrolyte wettability to an electrode assembly in the battery cell is provided. The apparatus includes a battery cell tray in which one or more preliminary battery cells are housed and an excitation unit which makes a contact opposite to contacting one side of the battery cell tray to apply megasonic vibration to the preliminary battery cell in a state in which the preliminary battery cell is housed. A method for manufacturing a battery cell using the apparatus is also provided.

19 Claims, 16 Drawing Sheets

(56) References Cited

U.S. PATENT DOCUMENTS

| | | | |
|---|---|---|---|
| 2013/0065111 A1 | 3/2013 | Kim et al. | |
| 2013/0244095 A1* | 9/2013 | Min | H01M 50/103 |
| | | | 429/185 |
| 2015/0244016 A1 | 8/2015 | Chung et al. | |
| 2018/0301743 A1* | 10/2018 | Nulman | H01G 11/80 |
| 2020/0020990 A1* | 1/2020 | Oba | H01M 10/0562 |

FOREIGN PATENT DOCUMENTS

| | | | | |
|---|---|---|---|---|
| CN | 106099158 A | * | 11/2016 | H01M 10/0404 |
| CN | 105720311 A | | 6/2018 | |
| JP | 2015-197968 A | | 11/2015 | |
| KR | 10-2012-0033647 A | | 4/2012 | |
| KR | 10-2014-0006722 A | | 1/2014 | |
| KR | 10-2017-0027387 A | | 3/2017 | |
| KR | 20170027387 A | * | 3/2017 | H01M 2/362 |
| KR | 10-2017-0059078 A | | 5/2017 | |
| KR | 10-2017-0088034 A | | 8/2017 | |
| KR | 10-2018-0093792 A | | 8/2018 | |
| KR | 10-2018-0106370 A | | 10/2018 | |
| WO | WO 2018/165606 A1 | | 9/2018 | |
| WO | WO-2018165606 A1 | * | 9/2018 | H01M 10/052 |

OTHER PUBLICATIONS

Extended European Search Report for European Application No. 20773456.7, dated Sep. 17, 2021.

* cited by examiner (a)

(b)

(c)

(a)

(b)

APPARATUS FOR MANUFACTURING BATTERY CELL TO ENHANCE ELECTRODE WETTING THROUGH VIBRATION, AND MANUFACTURING METHOD OF BATTERY CELL USING THE SAME

TECHNICAL FIELD

Cross Citation with Related Application(s)

This application claims the benefit of Korean Patent Application No. 10-2019-0030800 filed on Mar. 18, 2019 with the Korean Intellectual Property Office, the disclosure of which is incorporated herein by reference in its entirety.

The present disclosure relates to an apparatus for manufacturing a battery cell to enhance the electrolyte wettability through vibration, and a manufacturing method of a battery cell using the same.

BACKGROUND ART

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demand for electric vehicles and mobile devices continue to increase, the demand for batteries as energy sources is rapidly increasing. Accordingly, a lot of research on batteries capable of satisfying various needs has been carried out.

Typically, in terms of the material for batteries, the demand for lithium secondary batteries, such as lithium ion batteries, lithium ion polymer batteries, etc., which have advantages such as high energy density, discharge voltage, output stability, and the like is very high.

In addition, based on the shape of the battery case of each of the secondary batteries, the secondary batteries are classified into a cylindrical battery configured to have a structure in which an electrode assembly is built in a cylindrical metal container, a prismatic battery configured to have a structure in which an electrode assembly is built in a prismatic metal container, and a pouch type battery configured to have a structure in which an electrode assembly is built in a pouch type case made of an aluminum laminate sheet.

In particular, in recent years, much attention has been paid to a pouch type battery configured to have a structure in which such a stacked or stacked/folded type electrode assembly is built in a pouch type battery case made of an aluminum laminate sheet because of low manufacturing costs, light weight, easy modification of the shape thereof, etc. In addition, the use of such a pouch type battery has gradually increased.

In general, such a secondary battery is manufactured by sealing an electrode assembly having a structure including a positive electrode, a negative electrode and a separator interposed between the positive electrode and the negative electrode in a state in which the electrode assembly is built in a battery container together with an electrolyte.

In such a case, the secondary battery is manufactured by undergoing an aging process under conditions of a specific temperature, pressure and time so as to improve the wettability of the electrolyte to the electrode assembly, and undergoing a degassing process for discharging the gas generated in such process to the outside.

However, the aging process and the degassing process spend an extremely long time in order to sufficiently wet the electrode assembly with the electrolyte and to sufficiently remove bubbles. Accordingly, recently, attempts have been conducted to shorten the time by using a method using a vacuum, a method using a pressure, and the like when wetting the electrolyte.

Nevertheless, according to the above method, bubbles still often remain inside the secondary battery cell as shown in FIG. 1. In particular, micro-sized bubbles existing inside the secondary battery cell do not disappear for a long time, increases the amount of dissolved oxygen and thus adversely affect the capacity of the secondary battery, and pose a threat to battery safety by releasing more gas more than the space of a gas pocket that contains the gas.

Therefore, the degassing process is performed even after the above method, but it spends a long time to remove bubbles, which causes a problem that the process cost and manufacturing time are increased.

Therefore, there is a high need for a technology that can fundamentally solve the above-mentioned problems.

DETAILED DESCRIPTION OF THE INVENTION

Technical Problem

The present disclosure has been intended to solve the above-mentioned problems of the prior arts and other technical problems that have yet to be resolved.

As a result of repeated in-depth studies and various experiments, the present inventors have found that, by applying megasonic vibration to a preliminary battery cell in a state in which the preliminary battery cell is housed in a battery cell tray as described later, not only it is possible to increase a direct physical contact between an electrode assembly and an electrolyte due to vibration, thus enhancing the wettability of the electrolyte, but also it enables removal of small-sized bubbles and minimizes damage to the battery cell, thus effectively solving the problems of the prior arts. The present disclosure has been completed on the basis of such findings.

Technical Solution

In order to achieve the above object, according to one embodiment of the present disclosure, there is provided an electrolyte wetting apparatus for manufacturing a battery cell to enhance the wetting of an electrolyte to an electrode assembly in the battery cell, the apparatus comprising:

a battery cell tray configured to house at least one preliminary battery cell; and an excitation unit contacting one side of the battery cell tray to apply megasonic vibration to the at least one preliminary battery cell when the at least one preliminary battery cell is housed in the battery cell tray.

Accordingly, not only it is possible to increase a direct physical contact between the electrode assembly and the electrolyte due to a megasonic vibration, thereby enhancing the wettability of the electrolyte, but also it is possible to effectively remove bubbles, thus saving the time and cost required for manufacturing the battery cell and improving the safety of the battery cell.

Wherein, the megasonic vibration is a vibration having a frequency of 500 kHz to 3000 kHz, and is different from an ultrasonic wave which usually has a frequency of 20 kHz to 100 kHz.

As it has a high frequency in the range as described above, not only the small size of the bubbles can be removed, but also damage to the battery cell is reduced.

In addition, the electrolyte wetting is performed by a method of increasing the direct physical contact between the electrode assembly and the electrolyte by vibration.

However, a boundary layer has an influence on the removal of the bubbles, wherein the boundary layer means a thickness affected by a fluid. Such a boundary layer should have a size smaller than a size of the bubbles to be removed, so that it can affect the bubbles. Therefore, the smaller the boundary layer, the smaller the size of bubbles that can be removed (see FIG. 2).

Meanwhile, in the case of bubbles having a large size (diameter), the bubbles quickly rise to a surface and rupture, or only moisture is present, whereas the smaller the size of the bubbles, the longer the residence time, and the small bubbles do not rise to a surface and are present inside a fluid, and thus, it is a key point to remove small-sized bubbles.

Therefore, by making the boundary layer small, it is possible to remove even small-sized bubbles. The boundary layer becomes smaller as the frequency increases, as the viscosity of the fluid decreases, and as the temperature increases.

Accordingly, the present inventors have confirmed that when using megasonic vibration having a frequency greater than that of an ultrasonic wave, it is possible to remove even micro-sized or smaller bubbles inside the battery cell, and the present disclosure has been completed.

The megasonic excitation unit may be made of lead zirconate titanate (PZT).

Specifically, the megasonic vibration causes a vibration plate to vibrate by the excitation unit PZT using an AC voltage. As shown in FIG. 3, by allowing the contraction and expansion of the bubbles to repeatedly operate by a large pressure, a shock is given to the bubbles and a contraction and an explosion are caused by the pressure equal to or higher than the surface tension, thus removing the bubbles In such a way, according to the present disclosure, it is possible not only to enhance the wetting of the electrolyte, but also to effectively remove the bubbles in the electrolyte, thereby preventing a decrease in the battery capacity and improving the safety of the battery.

The preliminary battery cell for exhibiting such effects may consist of a structure in which an electrode assembly including a positive electrode, a negative electrode and a separator interposed between the positive electrode and the negative electrode is built in a battery case together with an electrolyte. As long as it has the above structure, its shape is not limited, and any of a cylindrical battery cell, a prismatic battery cell and a pouch-type battery cell can be used.

However, since the cylindrical or prismatic battery cell made of a metal can is relatively well fixed when housed in a battery cell tray, the battery cell tray including a recessed part corresponding to these shapes can be used.

On the other hand, since the pouch-type battery cell has a structure in which the shape can be easily deformed, it is not easy to fix a jig compared to the cylindrical or prismatic battery cell. Therefore, it is needless to say that a separate fixing member capable of fixing these battery cells may be further included, and its shape is not limited as long as it has a structure capable of fixing the pouch-type battery cell.

In this case, the preliminary battery cell may have a structure in which an upper part of the battery cell is partially or completely opened for effective removal of gas. Here, the upper part means the direction in which the upper surface of the battery cell tray is opened when housed in the battery cell tray. For example, it may mean an electrode terminal forming position in the case of the pouch type, and a cap part in the case of the cylindrical and prismatic types. Of course, a closed form is also usable so that a liquid medium is not flowed in depending on the type housed in the battery cell tray, but in this case, subsequently, an additional process of opening and then closing again may be required in order to further remove gas.

Meanwhile, for any type of battery cells, the housing structure of the battery cells can be used without limitation, and it may be housed as shown in FIGS. 4 to 6 below.

That is, as shown in FIG. 5, in the case of the cylindrical battery cell, all possible are a form in which it is erected so that a cap plate part is located at the upper part, or a form in which it is laid so that a cap plate and a bottom surface are in the same position with respect to the ground. As shown in FIGS. 4 and 6, the prismatic battery cell and pouch-type battery cell may be housed in a form in which it is erected so that electrode terminals are positioned at the upper part, in a form in which it is erected so that electrode terminals are located on the side with a smaller area facing the bottom, or in a state of being stacked so that electrode terminals are located on the side and the largest area faces the bottom.

Meanwhile, the battery cell tray may have a pipe shape in which the upper and lower surfaces are opened based on the ground, or a shape in which the upper surface is opened based on the ground so as to house the preliminary battery cells and which is concavely recessed in a direction of a lower surface from the opened area. In other words, it may have a hollow shape or a cup shape.

Therefore, the preliminary battery cell can be more easily housed and removed through the opened upper surface of the battery cell tray.

More specifically, the battery cell tray may have a structure in which the upper part as well as the lower part is opened and thus, the excitation unit applies megasonic vibration in a state of being in a direct contact with an edge of the battery cell tray on one side of the battery cell tray and the preliminary battery cell, or it may have a structure in which the lower part of the battery cell tray is closed, and the excitation unit is fixed opposite to the lower surface of the battery cell tray to apply megasonic vibration to the battery cell tray, thereby transmitting megasonic vibration to the preliminary battery cell.

In other words, the excitation unit can directly or indirectly apply megasonic vibration to the preliminary battery cell, and in consideration of various factors such as process efficiency and space constraints, it can effectively apply vibration by an appropriate method or configuration.

Further, the battery cell tray may or may not include a guard distinguishing the housing spaces of respective preliminary battery cells.

That is, it is not limited as long as it has a structure capable of appropriately housing and fixing the preliminary battery cells.

Meanwhile, the megasonic vibration may be applied once, or two or more times periodically or aperiodically.

Here, it is needless to say that the vibration frequency and cycle applied from the excitation unit can be appropriately selected according to conditions such as the number and size of the preliminary battery cells to which vibrations are applied.

In another specific embodiment, the preliminary battery cell may be immersed in a liquid medium in a state of being housed in the battery cell tray. Specifically, 5% or more of the preliminary battery cell may be immersed, but if the preliminary battery cell has an opened top structure, it may be immersed by 90, or less so as not to be affected.

At this time, the liquid medium is a medium that transmits the megasonic vibration applied from the excitation unit to the preliminary battery cell, and immerses the preliminary battery cells housed in the battery cell tray, and as a result, a space between the battery cell tray and the preliminary battery cells can be kept in a state of being filled.

Therefore, the megasonic vibration applied from the excitation unit can be more effectively transmitted to the preliminary battery cell while minimizing its loss, and can be uniformly transmitted to all areas of the preliminary battery cell, thereby effectively preventing problems such as damage or short circuit of the preliminary battery cells, which may occur due to the concentration of vibration in a specific area, such as an area adjacent to the excitation unit, with the battery cell tray being interposed therebetween.

In this case, the liquid medium is not greatly limited in its kind as long as it can effectively transmit vibrations from the excitation unit to the preliminary battery cells housed in the battery cell tray, and specifically, may be water in consideration of cost, ease of handling, etc.

In addition, the present inventors further confirmed that as described above, if a process temperature is increased, the boundary layer may become small, and thus, when the process temperature can be adjusted in the electrolyte wetting apparatus for manufacturing a battery cell, the process temperature can be raised to remove the bubbles having a finer size.

Therefore, the electrolyte wetting apparatus for manufacturing a battery cell according to the present disclosure may further include a temperature control unit, whose structure is not limited, and it may be included in the excitation unit to apply heat to the preliminary battery cell and/or the liquid medium through the excitation unit. It may also include a chamber housing the battery cell tray and the excitation unit, and may be one in which the chamber is capable of controlling the temperature.

At this time, the temperature may be 20 to 70 degrees Celsius since it should not affect other components of the battery cell.

Therefore, when a liquid medium is included, the temperature of the liquid medium may be 20 to 70 degrees Celsius.

Furthermore, in order to maximize the above effects, the preliminary battery cell may be moved up/down vertically in the tray. Through such sweeping, the effects of the megasonic can be maximized at all positions of the preliminary battery cell.

That is, the effects of the megasonic may vary depending on a distance between the preliminary battery cell and the excitation surface. At this time, since the length of the preliminary battery cell is long, the effects may be different at various positions of the preliminary battery cell. Therefore, this problem can be completely solved by the above-described movement to maximize the effects.

In addition, an oscillator such as an ultrasonic horn is immersed together in the liquid medium to add an additional vibration to the preliminary battery cell.

Moreover, according to one embodiment of the present disclosure, in order to further improve the electrolyte wetting effect, a vacuum may be further applied to an upper surface of the battery cell tray.

Meanwhile, according to another embodiment of the present disclosure, there is provided a method of manufacturing a battery cell using an electrolyte wetting apparatus for manufacturing a battery cell, the method comprising the steps of:

a) manufacturing a preliminary battery cell by sealing an electrode assembly in a state of being housed inside a battery case together with an electrolyte;

b) housing the preliminary battery cell in a battery cell tray of the electrolyte wetting apparatus; and c) applying megasonic vibration to the preliminary battery cell through an excitation unit.

Here, a housing form of the preliminary battery cell, a structure of the battery cell tray, a megasonic vibration method, etc. are as described above.

In addition, as described above, in order to make a boundary layer small and remove even fine-sized bubbles, in addition to the megasonic vibration, the step c) may be performed at 20 to 70 degrees Celsius, specifically 30 to 70 degrees Celsius, and more specifically 40 to 60 degrees Celsius.

Further, a liquid medium may be included in the battery cell tray, and 5% or more of the preliminary battery cell based on the external surface area may be immersed in the liquid medium. In this case, an ultrasonic vibration may be added to the liquid medium in addition to the megasonic vibration, and/or the temperature may be within the above range.

Furthermore, in order to more smoothly perform the electrolyte wetting and the bubble removal in the step c), vacuum may be applied to the preliminary battery cells. In this case, if an upper part of the preliminary battery cells has an opened form, the bubble removal can be smoothly performed immediately; and if it has a closed form, the effect of collecting bubbles in one place can be maximized.

DETAILED DESCRIPTION OF THE EMBODIMENTS

Now, the present disclosure will be described in more detail with reference to the accompanying drawings based on Examples. These examples are provided for illustrative purposes only and should not be construed as limiting the scope of the present disclosure.

Figure 1:
FIG. 1 is a photograph showing a state where bubbles are generated in a conventional battery cell.
Figure 2:
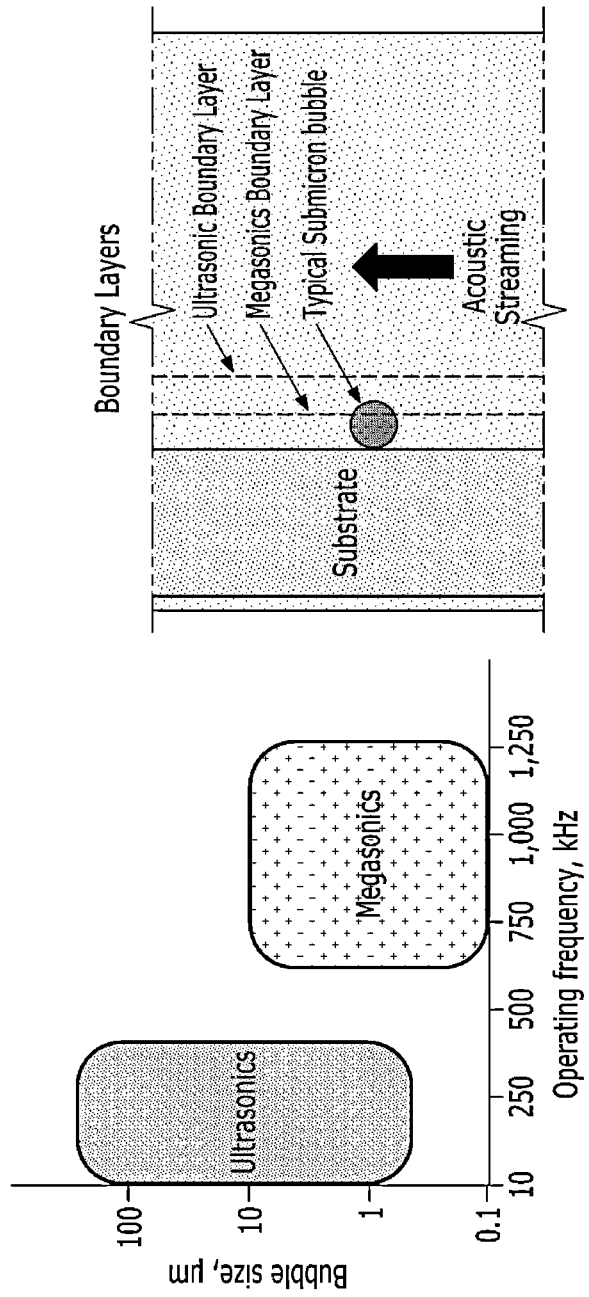
FIG. 2 is a photograph and graph showing a boundary layer of each vibration and a removable bubble size.
Figure 3:
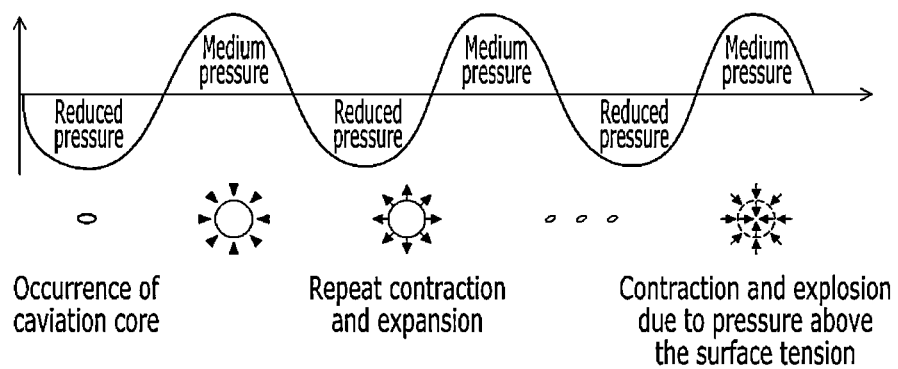
FIG. 3 is a schematic view showing a process in which bubbles are removed by a megasonic vibration.
Figure 4:
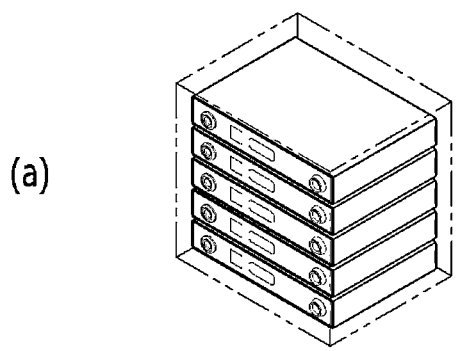
FIG. 4 is a schematic view showing a form in which a prismatic battery cell is housed in a battery cell tray.
Figure 4:
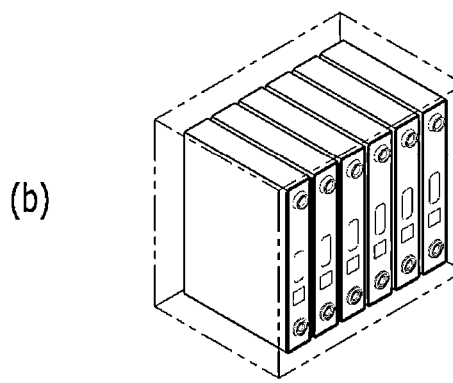
Figure 4:
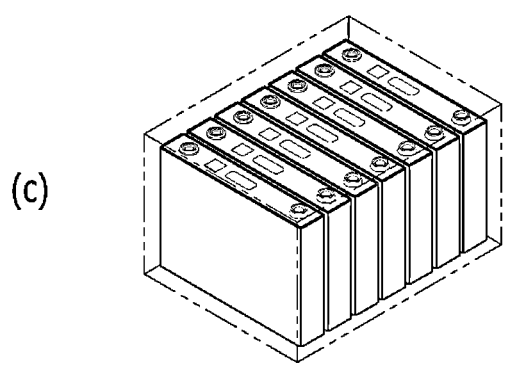
Figure 5:
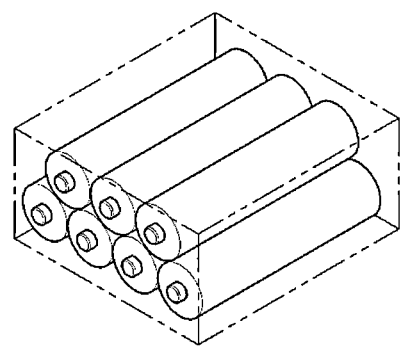
FIG. 5 is a schematic view showing a form in which a cylindrical battery cell is housed in a battery cell tray.
Figure 5:
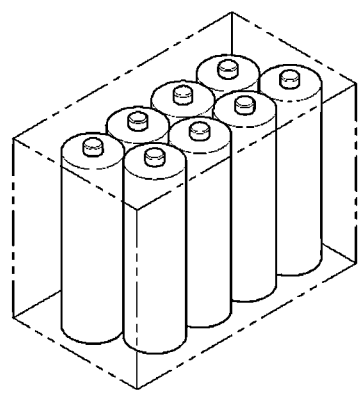
Figure 6:
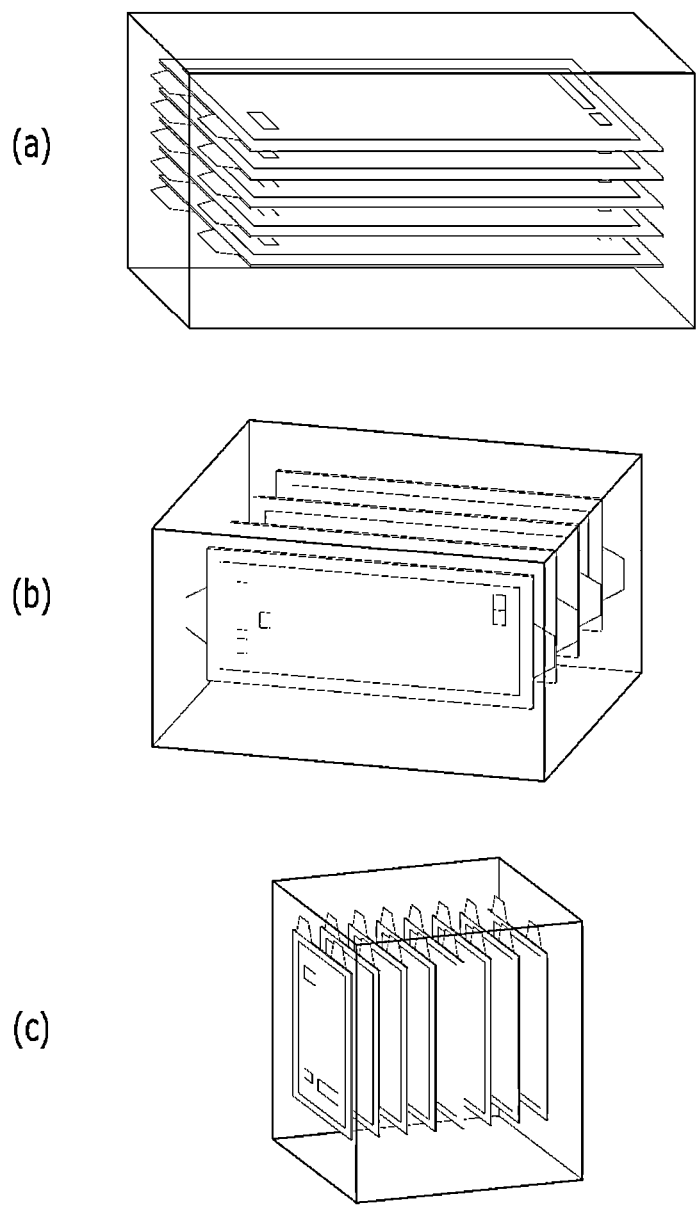
FIG. 6 is a schematic view showing a form in which a pouch-type battery cell is housed in a battery cell tray.
Figure 7:
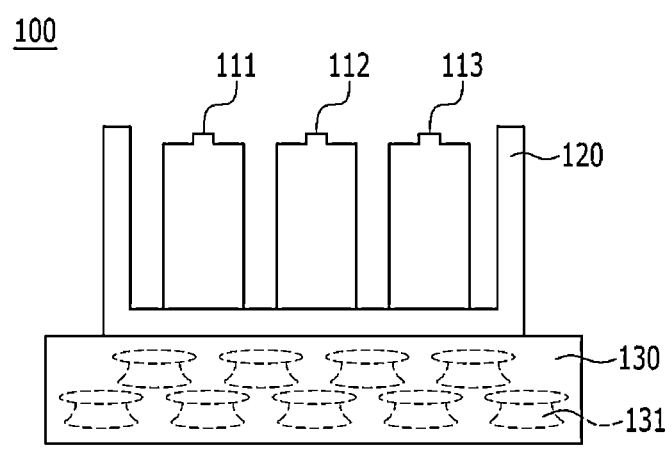
FIG. 7 is a schematic view showing a structure of an electrolyte wetting apparatus for manufacturing a battery cell according to one embodiment of the present disclosure.
Figure 8:
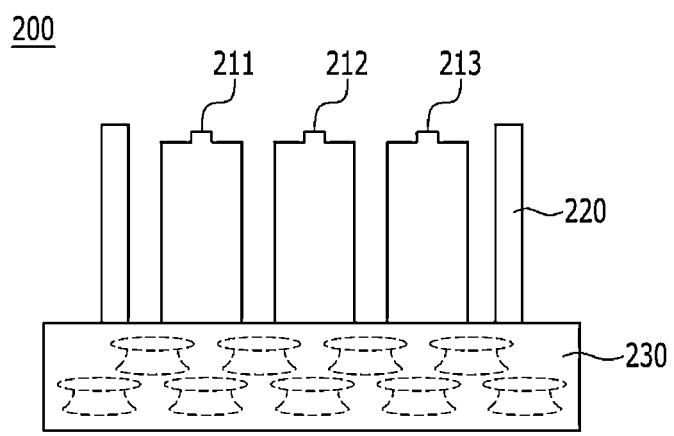
FIG. 8 is a schematic view showing a structure of an electrolyte wetting apparatus for manufacturing a battery cell according to another embodiment of the present disclosure.

FIGS. 7 and 8 show schematic views schematically showing a structure of an electrolyte wetting apparatus for manufacturing a battery cell according to one embodiment of the present disclosure.

First, referring to FIG. 7, the electrolyte wetting apparatus 100 has a structure including: a battery cell tray 120 for housing one or more preliminary battery cells 111, 112 and 113; and a megasonic excitation unit 130 which make contact opposite to one side of the battery cell tray and includes megasonic vibration elements 131 therein.

The battery cell tray 120 has a shape in which an upper surface is opened based on the ground and is concavely recessed in a direction of a lower surface, and its lower part is closed so that the excitation unit 130 is fixed opposite to the lower surface of the battery cell tray 120.

Therefore, the preliminary battery cells 111, 112 and 113 can be more easily housed and removed through the opened upper surface of the battery cell tray 120, and the megasonic vibration is applied to the battery cell tray 120 to be transmitted to the preliminary battery cells 111, 112 and 113.

Further, the excitation unit includes one or more megasonic vibration elements 131, which are spaced apart at a predetermined interval.

Referring to FIG. 8, the battery cell tray 220 of the electrolyte wetting apparatus 200 has a structure in which the lower part is opened, and thus, is the same as in FIG. 7 except that megasonic vibration is applied in a state in which the excitation unit 230 is in a state of being in direct contact with the preliminary battery cells 211, 212 and 213.

Therefore, the megasonic vibration can be applied to the preliminary battery cells, and thus, it is possible not only to easily wet the electrolyte, but also to remove even small-sized bubbles.

FIGS. 9 to 13 show electrolyte wetting apparatuses for manufacturing a battery cell having a structure in which preliminary battery cells are immersed in a liquid medium according to another embodiment of the present disclosure.

Figure 9:
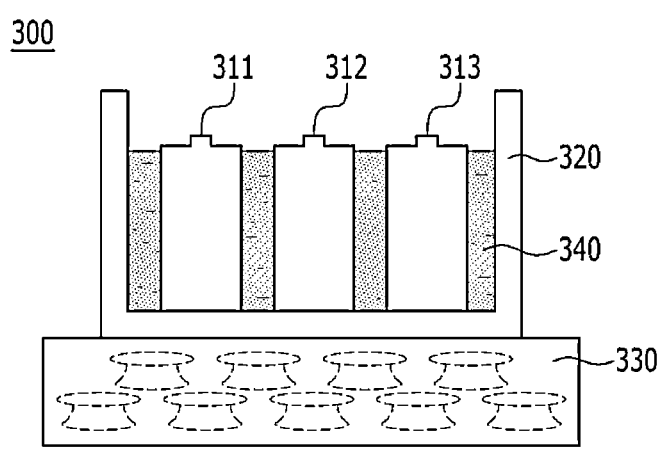
FIG. 9 is a schematic view showing a structure of an electrolyte wetting apparatus for manufacturing a battery cell according to another embodiment of the present disclosure.

Referring to FIG. 9, the electrolyte wetting apparatus 300 for manufacturing a battery cell includes: a battery cell tray 320 for housing one or more preliminary battery cells 311, 312 and 313; and a megasonic excitation unit 330 which faces and makes a contact opposite to one side of the battery cell tray and includes megasonic vibration elements therein, wherein the preliminary battery cells 310 are immersed in a liquid medium 340 in a state of being housed in the battery cell tray.

At this time, the liquid medium 340 may be water, and the temperature of the liquid medium 340 may be raised to increase the internal temperature of the preliminary battery cells 311, 312 and 313, thereby further lowering a boundary layer.

Figure 10:
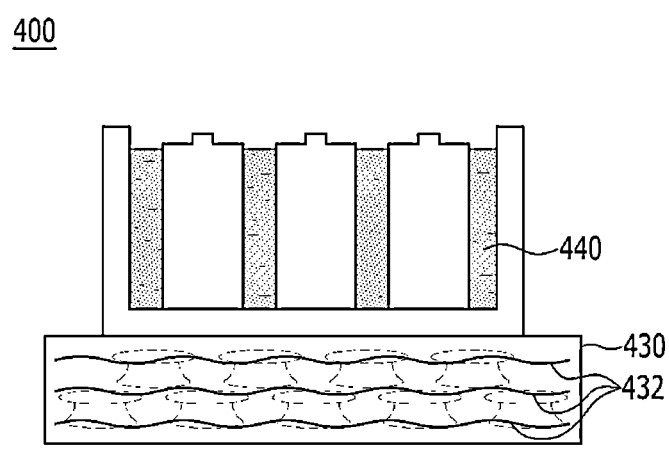
FIG. 10 is a schematic view showing a structure of an electrolyte wetting apparatus for manufacturing a battery cell according to yet another embodiment of the present disclosure.
Figure 11:
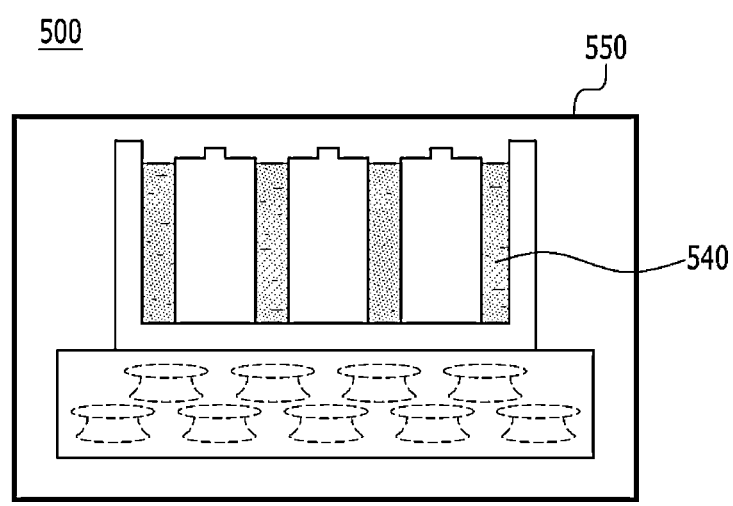
FIG. 11 is a schematic view showing a structure of an electrolyte wetting apparatus for manufacturing a battery cell according to yet another embodiment of the present disclosure.

For this purpose, FIGS. 10 and 11 schematically show an electrolyte wetting apparatus further comprising a temperature control unit according to still another embodiment of the present disclosure.

Referring to FIG. 10, the electrolyte wetting apparatus 400 for manufacturing a battery cell further includes a temperature control unit 432, and has the same structure as in FIG. 9, except that the temperature control unit 432 is included in the excitation unit 430 in a form of a heating wire.

Meanwhile, an electrolyte wetting apparatus 500 for manufacturing a battery cell shown in FIG. 11 has a structure including a chamber 550 capable of controlling temperature as a temperature control unit.

As the apparatus further includes the temperature control unit in this way, the internal temperature of the preliminary battery cells can be increased to further lower the boundary layer.

Figure 12:
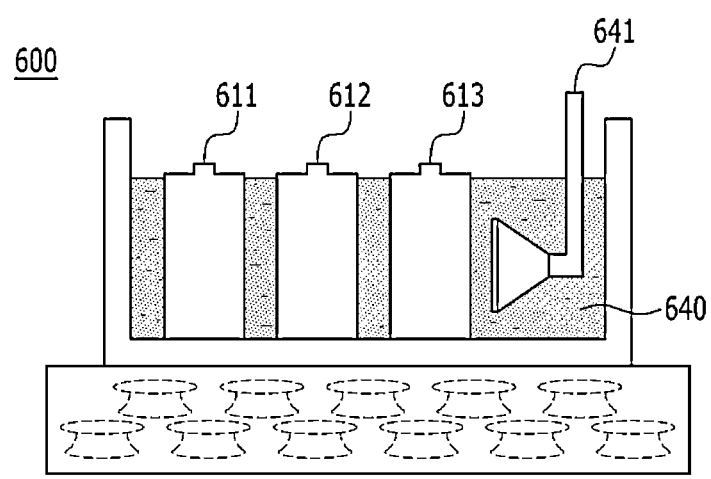
FIG. 12 is a schematic view showing a structure of an electrolyte wetting apparatus for manufacturing a battery cell according to still yet another embodiment of the present disclosure.
Figure 13:
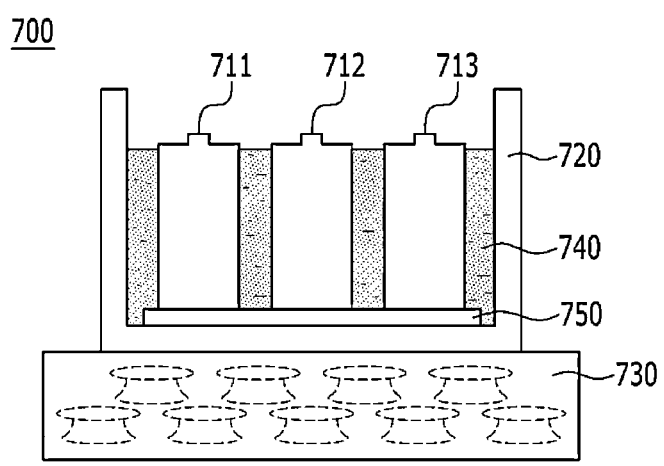
FIG. 13 is a schematic view showing a structure of an electrolyte wetting apparatus for manufacturing a battery cell according to still yet another embodiment of the present disclosure.
Figure 14:
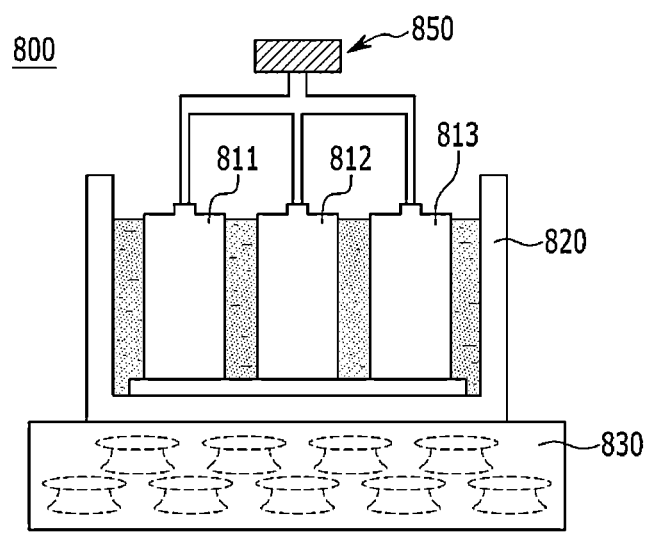
FIG. 14 is a schematic view showing a structure of an electrolyte wetting apparatus for manufacturing a battery cell according to a further embodiment of the present disclosure.

Moreover, FIGS. 12 to 14 show electrolyte wetting apparatuses for manufacturing a battery cell, in which an additional unit is added to more smoothly perform the bubble removal.

First, referring to FIG. 12, an electrolyte wetting apparatus 600 for manufacturing a battery cell has a structure in which the preliminary battery cells 611, 612 and 613 are immersed in the liquid medium 640, similarly to FIG. 9, and at the same time, an oscillator such as an ultrasonic horn 641 is immersed together in the liquid medium 640 to add additional vibrations to the preliminary battery cells 611, 612 and 613. Therefore, the electrolyte wettability and the bubble removal effect can be further improved.

Further, referring to FIG. 13, an electrolyte wetting apparatus 700 for manufacturing a battery cell further includes a moving unit 750 for moving the preliminary battery cells 711, 712 and 713 in a vertical direction, wherein the preliminary battery cells 711, 712 and 713 can be swept in a vertical direction to add similar vibrations to the preliminary battery cells 711, 712 and 713 as a whole, thereby effectively preventing problems such as damage or short circuit of the preliminary battery cell which may occur by concentrating the vibrations in a specific area, and also maximizing the effects of the present disclosure.

Finally, referring to FIG. 14, an electrolyte wetting apparatus 800 for manufacturing a battery cell further includes a vacuum-applying part 850 to apply vacuum to the preliminary battery cells 811, 812 and 813, thereby improving the effects of the present disclosure.

Hereinafter, preferred examples will be provided to assist in the understanding of the present disclosure, but the following examples are presented for illustrative purposes only. It will be apparent to those skilled in the art that various modifications and variations can be made without departing from the spirit or scope of the invention. Thus, it is intended that the present disclosure covers the modifications and variations of the invention provided they come within the scope of the appended claims and their equivalents.

Example 1

A jelly roll electrode assembly (18650 HB7, LG Chem. Ltd.) having a diameter of 18 mm and a height of 65 mm was placed in a cylinder, and then, an electrolyte was injected into the cylinder until 30 ml of the electrolyte was filled (This is an amount sufficient to completely immerse the jelly roll electrode assembly). As the electrolyte, an electrolyte of EC:EMC:DMC=3:3:4 (Vol %) in which 1M $LiPF_6$ was dissolved was used.

The cylinder was placed to be erected in a tray to which a megasonic oscillator was attached, and the tray was filled with water (25° C.) so that the cylinder was properly filled (approximately 18 ml scale).

Figure 15:
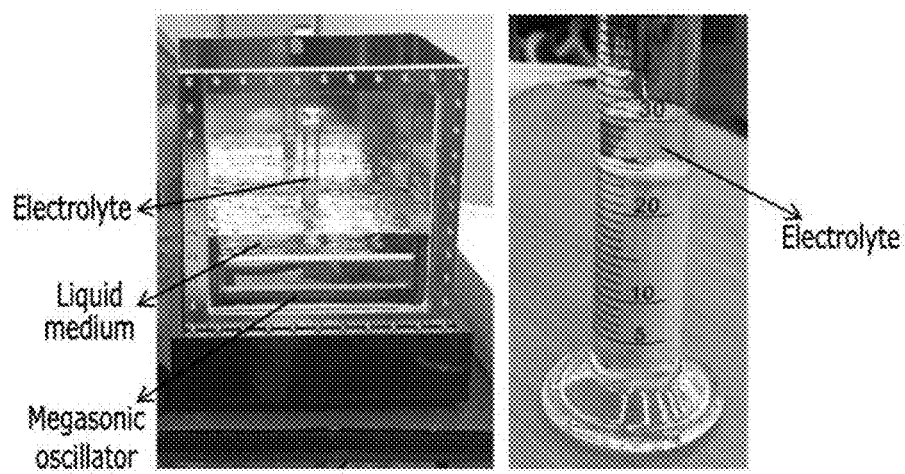
FIG. 15 is a photograph showing an experimental method of Example 1 and Comparative Example 1.

As shown in FIG. 9, the megasonic vibration (1 MHz) was applied to the secondary battery for 60 minutes (See the figure on the left of FIG. 15)

Comparative Example 1

This was performed as in Example 1, except that no megasonic vibration was applied (See the figure on the right of FIG. 15).

Comparative Example 2

This was performed as in Example 1, except that an ultrasonic vibration (100 kHz) was added for 60 minutes using an ultrasonic horn instead of the megasonic vibration.

Experimental Example 1

Figure 16:
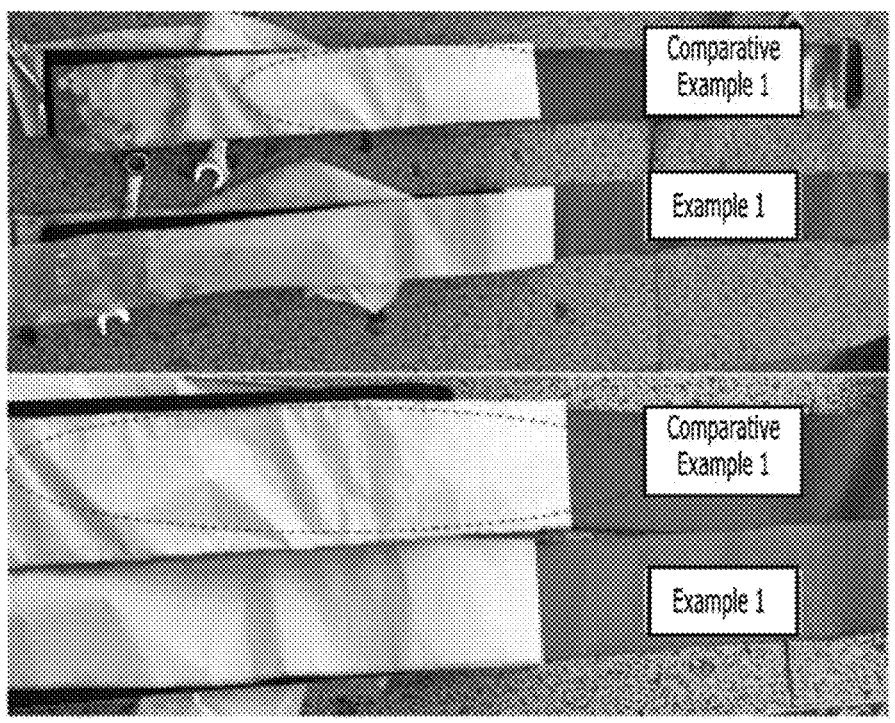
FIG. 16 is a comparative photograph according to Experimental Example 1.
Figure 16:
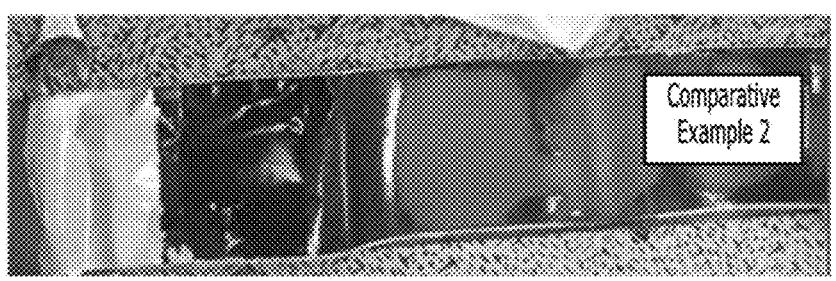

The jelly roll electrode assemblies of Example 1 and Comparative Examples 1 and 2 were unfolded and photographed to confirm whether the electrolyte was wetted and whether the electrodes were damaged, and the results are shown in FIG. 16.

Referring to FIG. 16, it was confirmed that in the case of Example 1 in which the megasonic was applied, the electrolyte was well penetrated into a separator between the positive electrode and the negative electrode, whereas in the case of Comparative Example 1, the electrolyte was not well wetted inside the middle (see the stripe pattern in the middle)

On the other hand, it can be seen that in the case of Comparative Example 2 in which the ultrasonic vibration was applied, the electrode layer was significantly damaged. In conclusion, the ultrasonic wave penetrates the electrolyte well, but it is difficult to use because it applies a great impact to the electrode layer (see the figure at the bottom of FIG. 16)

Although the exemplary embodiments of the present disclosure have been disclosed for illustrative purposes, those skilled in the art will appreciate that various application and modifications can be made, without departing from the scope and spirit of the invention.

ADDITIONAL REFERENCE SIGN

440: liquid medium
540: liquid medium
720: battery cell tray
730: excitation unit
740: liquid medium
820: battery cell tray
830: excitation unit
840: liquid medium

INDUSTRIAL APPLICABILITY

As described above, the electrolyte wetting apparatus for manufacturing a battery cell according to the present disclosure applies a megasonic vibration to a preliminary battery cell to increase a direct physical contact between an electrode assembly and a electrolyte due to the vibration, whereby it is possible not only to improve the electrolyte wettability, but also to remove even small-sized bubbles. Therefore, since the bubbles inside the battery cell can be effectively removed, it is possible to prevent a decrease in a capacity of the battery cell and to improve safety and further to save time and cost for manufacturing the battery cell.

Moreover, it is possible to effectively remove even fine bubbles having a smaller size, by using a method of immersing the preliminary battery cell in a liquid medium and increasing the temperature, or adding an additional vibration, or adding a moving unit and applying a vacuum, etc.

The invention claimed is:

1. A battery cell manufacturing apparatus for enhancing the wetting of an electrolyte to an electrode assembly in a battery cell, the apparatus comprising:
    a battery cell tray configured to house at least one preliminary battery cell; and
    an excitation unit contacting one side of the battery cell tray to apply megasonic vibration to the at least one preliminary battery cell when the at least one preliminary battery cell is housed in the battery cell tray,
    wherein the megasonic vibration is a vibration having a frequency of 500 kHz to 3000 kHz.

2. The apparatus according to claim 1, wherein the battery cell tray has an opened lower part, and
    wherein the excitation unit applies the megasonic vibration while being in direct contact with the at least one preliminary battery cell.

3. The apparatus according to claim 1, wherein the battery cell tray has a closed lower part, and
    wherein the excitation unit is fixed opposite to the closed lower part to apply megasonic vibration to the battery cell tray such that the megasonic vibration is transmitted to the at least one preliminary battery cell.

4. The apparatus according to claim 1, further comprising a liquid medium in the battery cell tray, and
    wherein the at least one preliminary battery cell is immersed in the liquid medium when the at least one battery cell is housed in the battery cell tray.

5. The apparatus according to claim 4, wherein the liquid medium is water.

6. The apparatus according to claim 4, wherein a temperature of the liquid medium is 20 degrees Celsius to 70 degrees Celsius.

7. The apparatus according to claim 1, further comprising a temperature control unit.

8. The apparatus according to claim 7, wherein the temperature control unit is included in the excitation unit.

9. The apparatus according to claim 7, wherein the temperature control unit is a chamber housing the battery cell tray and the excitation unit, and
    wherein the chamber is temperature-adjustable.

10. The apparatus according to claim 1, further comprising a moving unit configured to move the at least one preliminary battery cell vertically relative to the excitation unit when the at least one preliminary battery cell is housed in the battery cell tray.

11. The apparatus according to claim 1, further comprising a vacuum-applying unit at an upper surface of the battery cell tray, the vacuum-applying unit being configured to apply a vacuum to the at least one preliminary battery cell when the at least one preliminary battery cell is housed in the battery cell tray.

12. The apparatus according to claim 4, further comprising a temperature control unit.

13. The apparatus according to claim 4, further comprising a moving unit configured to move the at least one preliminary battery cell vertically relative to the excitation unit when the at least one preliminary battery cell is housed in the battery cell tray.

14. The apparatus according to claim 4, further comprising a vacuum-applying unit at an upper surface of the battery cell tray, the vacuum-applying unit being configured to apply a vacuum to the at least one preliminary battery cell when the at least one preliminary battery cell is housed in the battery cell tray.

15. The apparatus according to claim 4, further comprising an oscillator immersed in the liquid medium.

16. The apparatus according to claim 15, wherein the oscillator is an ultrasonic horn.

17. A method of manufacturing a battery cell using the apparatus according to claim 1, the method comprising the steps of:
   a) manufacturing the at least one preliminary battery cell by sealing an electrode assembly in a state of being housed inside a battery case together with an electrolyte;
   b) housing the at least one preliminary battery cell in the battery cell tray of the apparatus; and
   c) applying megasonic vibration to the at least one preliminary battery cell through the excitation unit.

18. The method of manufacturing a battery cell according to claim 17, wherein the battery cell tray includes a liquid medium therein, and the at least one preliminary battery cell is immersed in the liquid medium.

19. The method of manufacturing a battery cell according to claim 17, wherein the step c) is performed while a vacuum is applied to the at least one preliminary battery cell.

* * * * *